(12) United States Patent
Dewey et al.

(10) Patent No.: US 11,119,862 B2
(45) Date of Patent: Sep. 14, 2021

(54) DELTA INFORMATION VOLUMES TO ENABLE CHAINED REPLICATION OF DATA BY UPLOADING SNAPSHOTS OF DATA TO CLOUD

(71) Applicant: Seagate Technology LLC, Cupertino, CA (US)

(72) Inventors: Douglas William Dewey, Longmont, CO (US); Ian Robert Davies, Longmont, CO (US); Kenneth F. Day, III, Cedar Park, TX (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/599,841

(22) Filed: Oct. 11, 2019

(65) Prior Publication Data

US 2021/0109814 A1 Apr. 15, 2021

(51) Int. Cl.
*G06F 11/14* (2006.01)
*G06F 3/06* (2006.01)

(52) U.S. Cl.
CPC .......... *G06F 11/1451* (2013.01); *G06F 3/064* (2013.01); *G06F 3/067* (2013.01); *G06F 3/0617* (2013.01); *G06F 3/0679* (2013.01); *G06F 11/1469* (2013.01); *G06F 2201/84* (2013.01)

(58) Field of Classification Search
CPC .... G06F 11/1451; G06F 3/0617; G06F 3/064; G06F 3/067; G06F 3/0679; G06F 11/1469
See application file for complete search history.

(56) References Cited

U.S. PATENT DOCUMENTS

| | | | |
|---|---|---|---|
| 7,404,051 B2 | 7/2008 | Shitomi | |
| 7,567,991 B2 | 7/2009 | Armangau et al. | |
| 8,037,267 B2 * | 10/2011 | Jinno | G06F 1/3221 |
| | | | 711/162 |
| 8,060,889 B2 | 11/2011 | Sim-Tang | |
| 8,332,354 B1 | 12/2012 | Chatterjee et al. | |
| 8,805,780 B2 | 8/2014 | Pudipeddi et al. | |
| 9,411,717 B2 | 8/2016 | Goss et al. | |
| 9,665,306 B1 | 5/2017 | Patwardhan | |
| 9,811,532 B2 | 11/2017 | Parkison et al. | |
| 10,055,149 B2 | 8/2018 | Dewey et al. | |
| 2005/0144407 A1 | 6/2005 | Colgrove et al. | |
| 2010/0082921 A1 | 4/2010 | Thompson et al. | |

(Continued)

*Primary Examiner* — Tammara R Peyton
(74) *Attorney, Agent, or Firm* — Hall Estill Law Firm

(57) ABSTRACT

Method and apparatus for managing data in a distributed data storage system, such as but not limited to a cloud computing environment. In some embodiments, snapshots of a data set are uploaded from a source storage subsystem to a cloud store, along with intervening difference information volumes (DIVs). The DIVs are data structures that identify a set of updated data blocks that have been changed by the source storage subsystem between each successive pair of the snapshots. A reader subsystem requests and uses the latest DIV to request the latest set of changed data blocks from the cloud store, and uses the latest set of changed data blocks to update a previous snapshot to generate a copy of the most recent snapshot. The source and reader subsystems can comprise Internet of Things (IoT) devices, client devices, edge computing devices, etc. from different vendors and which utilize different protocols.

20 Claims, 5 Drawing Sheets

(56) References Cited

U.S. PATENT DOCUMENTS

| | | |
|---|---|---|
| 2010/0228919 A1 | 9/2010 | Stabrawa et al. |
| 2013/0297899 A1 | 11/2013 | Kawaguchi |
| 2014/0059007 A1 | 2/2014 | Akirav et al. |
| 2014/0081911 A1 | 3/2014 | Deshpande |
| 2014/0244896 A1 | 8/2014 | Goss et al. |
| 2015/0060897 A1 | 3/2015 | Dayal et al. |
| 2015/0113317 A1* | 4/2015 | Ouyang ............ G06F 11/1464 714/6.3 |
| 2015/0127661 A1 | 5/2015 | Zamir et al. |
| 2015/0127768 A1 | 5/2015 | Zamir et al. |
| 2015/0370502 A1 | 12/2015 | Aron et al. |
| 2016/0117163 A1 | 4/2016 | Fukui et al. |
| 2016/0170823 A1 | 6/2016 | Miller et al. |
| 2016/0335278 A1 | 11/2016 | Tabaaloute et al. |
| 2017/0139781 A1 | 5/2017 | Camp et al. |
| 2017/0206016 A1 | 7/2017 | Sun et al. |
| 2017/0249222 A1 | 8/2017 | Patnalk et al. |

* cited by examiner

US 11,119,862 B2

1

DELTA INFORMATION VOLUMES TO ENABLE CHAINED REPLICATION OF DATA BY UPLOADING SNAPSHOTS OF DATA TO CLOUD

SUMMARY

Various embodiments of the present disclosure are generally directed to a method and apparatus for managing data in a distributed data storage system, such as but not limited to a cloud computing environment.

In some embodiments, snapshots of a data set are uploaded from a source storage subsystem to a cloud store, along with intervening difference information volumes (DIVs). The DIVs are data structures that identify a set of updated data blocks that have been changed by the source storage subsystem between each successive pair of the snapshots. The latest DIV is used to identify and transfer the latest set of changed data blocks from the cloud store to a reader subsystem. The reader subsystem uses the latest set of changed data blocks to update a previous snapshot to generate a copy of the most recent snapshot. In some embodiments, the source and reader subsystems can comprise Internet of Things (IoT) devices, client devices, edge computing devices, etc. from different vendors and which utilize different protocols.

These and other features and advantages which characterize the various embodiments of the present disclosure can be understood in view of the following detailed discussion and the accompanying drawings.

DETAILED DESCRIPTION

Figure 1:
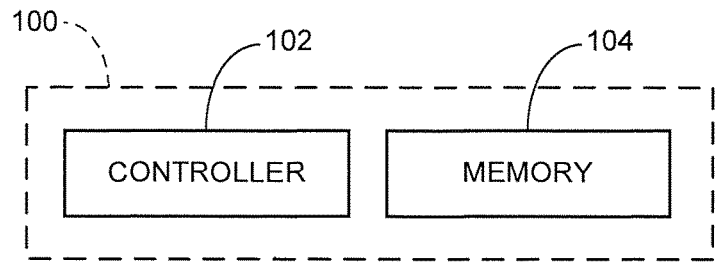
FIG. 1 provides a functional block representation of a data storage device constructed and operated in accordance with various embodiments of the present disclosure.

The present disclosure generally relates to systems and methods for storing data in a distributed data storage environment, such as but not limited to a cloud computing environment.

Cloud computing environments generally operate to store and process data across a geographically distributed network. Network services such as computational resources, software and/or data are made available to various user devices (clients) via a wide area network, such as but not limited to the Internet.

A cloud computing network is generally arranged as an object storage system whereby storage volumes (e.g., files) from the clients are stored in, and replicated to, various storage locations throughout the system in the form of snapshots (copies at a particular point in time). Cloud computing often includes the use of cloud stores (e.g., large scale data centers, etc.) to provide industrial-scale storage and processing resources.

Edge computing refers to a cloud storage strategy where at least certain types of storage and processing resources are located at the "edge" of the network. Instead of having the main cloud stores perform most of the data processing, intermediary type devices can interface between the client devices and the main cloud stores. This can reduce the bandwidth requirements on the system and provide better response times and other efficiencies. Edge computing has particular applicability to so-called IoT (Internet of Things) devices, since IoTs tend to generate massive amounts of data. It makes sense to decentralize certain data storage and replication efforts to locations that are logically and/or physically closer to the sources of the data generation activities.

While operable, a limitation with this approach relates to the use of equipment from different storage system vendors to access and replicate data sets. Due to differences in architecture and data storage protocols, as well as the general undesirability (or unwillingness) of different vendors to share proprietary algorithms and information, a data replication operation across different vendor platforms may require the transfer of an entire volume of data, even if only a few changes have been made since the last recorded snapshot. This can have undesirable effects on network performance.

Accordingly, there is a continual need for improvements in the manner in which data volumes can be efficiently accessed and duplicated among numerous reader subsystems without consuming significant network resources. Various embodiments of the present disclosure are directed to a method and apparatus to address these and other needs.

In some embodiments, a computer network is provided. The network may be a cloud computing environment, may utilize edge computing devices, and may involve the processing of IoT style data, but other configurations and environments can be utilized so these characterizations are merely exemplary and are not limiting.

A distributed data set from a source storage subsystem is stored as a first volume in a cloud storage system. Without limitation, the source storage subsystem ("source") may take the form of a client device, an edge computing device, etc. Regardless, the source has the capability of generating and updating data sets from a user. The cloud storage system ("cloud store") may take the form of a network server or some other processing/storage element in the network configured to store the data sets from the source.

At such time that a replication operation is desired, a reader storage subsystem ("reader") requests and receives the DIV from the cloud store. The reader may take any number of suitable forms such as another network server, client device, edge computing device, etc. The reader uses the DIV in combination with a prior snapshot to replicate the latest distributed data set in a local memory of the reader. In this way, only the most recently changed data blocks can be requested and retrieved from the cloud store, rather than requiring a complete transfer of the latest snapshot. Metadata can be generated and tracked to indicate the replication activities among various readers, and this metadata can be accessed by other readers as well as the cloud store.

These and other features and advantages of various embodiments can be understood beginning with a review of FIG. 1 which shows an exemplary data storage device 100. The device 100 is characterized as a solid-state drive (SSD), although other configurations can be used.

The device 100 includes a controller circuit 102 which provides top-level control and communication functions as the device interacts with a host device (not shown) to store and retrieve host user data. A memory module 104 provides a non-volatile memory (NVM) store for data from the host device. The controller 102 may take the form of one or more programmable CPU processor(s) and the memory may include 3D NAND flash memory.

Figure 2:
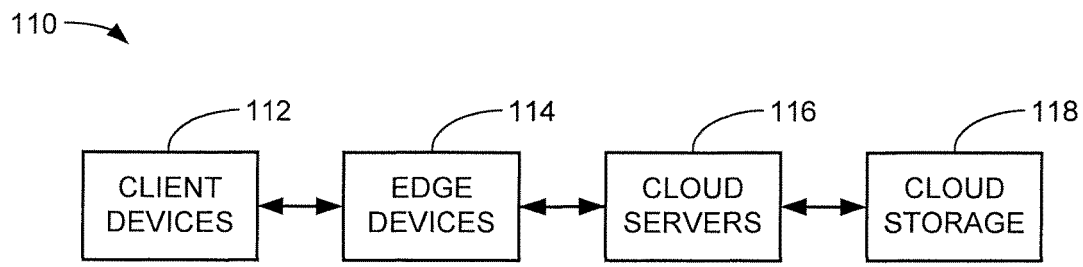
FIG. 2 illustrates a cloud computing environment in accordance with some embodiments.

FIG. 2 represents a network 110 in which a number of storage devices such as 100 from FIG. 1 may be implemented. The network 110 is characterized as a cloud computing environment and includes a number of client devices 112, edge devices 114, cloud servers 116 and cloud storage devices 118.

The client devices 112 can take a number of user device forms including computers, laptops, smart phones, tablets, gaming systems, IoT devices, etc. The edge devices 114 can provide localized data processing and computation services for the client devices including servers, routers, computers, etc.

Data centers may be used to implement the cloud servers 116 and the cloud storage devices to provide high capacity computation and storage capabilities. It will be appreciated that the cloud computing environment 110 of FIG. 2 is merely illustrative and the various embodiments presented herein can be adapted for any number of different environments as required.

Figure 3:
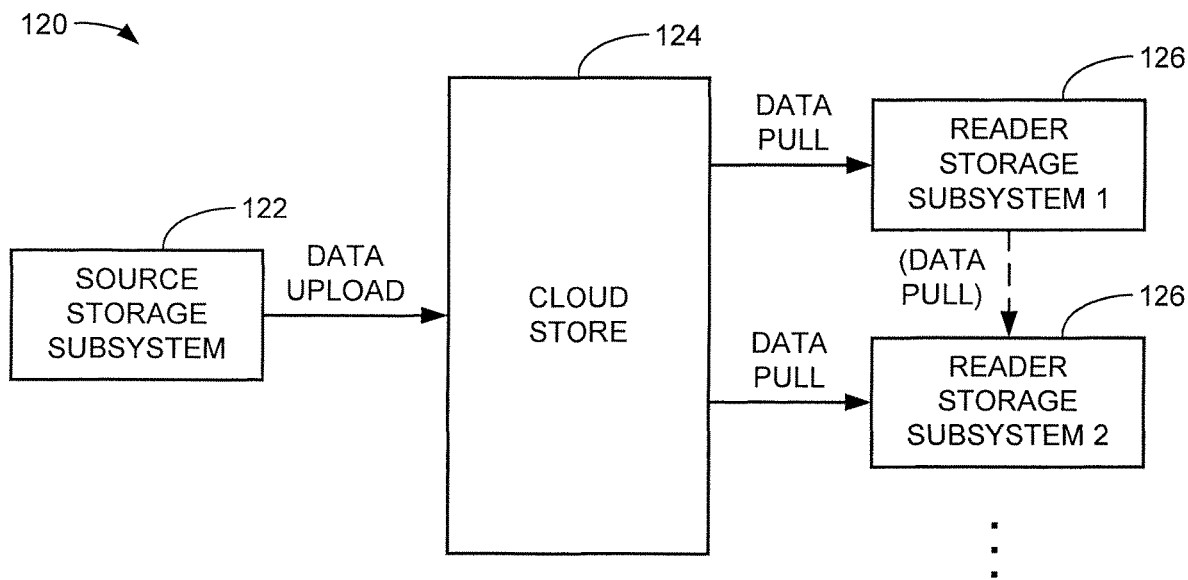
FIG. 3 shows a data replication operation among a source storage subsystem, a cloud storage system and multiple reader storage subsystems in accordance with some embodiments.

FIG. 3 shows another network 120 similar to the network 110 of FIG. 2. The network 120 includes a source storage subsystem 122, a cloud storage system 124 and a number of reader storage subsystems 126. As explained below, data provided by the source storage subsystem 122 ("source") to the cloud storage system 124 ("cloud store") is desired to be replicated onto the respective reader storage subsystems 126 ("readers"). While not required, it is contemplated that the various elements may be provided by different vendors and operate using different protocols, proprietary information, etc.

In one example, the source 122 corresponds to one of the client devices 112 in FIG. 2, the cloud store 124 corresponds to one of the cloud servers 116 in FIG. 2, and the various readers 126 may correspond to some other element of the system including an edge device 114, another client device 112, another cloud server 116, another set of cloud storage devices 118, or some other device in the network.

As noted above, one problem that may be encountered is that, for each of the readers desiring to pull data from the cloud store, the reader does not have immediate knowledge of which data has changed between each snapshot. In order to replicate the data, the reader subsystems would have to request the entire volume image, which can be prohibitive at cloud speeds (or even local attached speeds).

Since the cloud store may enact a third party cloud infrastructure, proprietary code may be operating in the cloud store and so it may not be feasible to access this code in order to determine the differences between the snapshots. Bypassing the cloud store and having the reader subsystems contact the source subsystem directly is not a viable option due to communication, authentication and compatibility limitations, as well as on the basis that this would tend to run counter to the goal of easy inter-vendor interoperability among the various cloud attached devices.

Accordingly, as discussed below, each source such as 122 operates to generate difference information in a new volume in the cloud store 124 after the source has used that same information in transferring the data. This difference information is referred to herein as a "delta information volume" (DIV), and represents a storage volume in the cloud that includes metadata identifying the changed portions between two successive snapshots that are also stored in the cloud. When multiple successive snapshots are uploaded, a corresponding set of intervening DIVs will be provided, with each DIV identifying a set of updated data blocks between each successive pair of the snapshots (e.g., a former or most previously generated snapshot and a latter or latest snapshot, etc.).

The contents of the DIV can take a variety of forms. In some embodiments, the DIV includes metadata that identifies information associated with both of the respective bounding snapshots. These can be referred to as snapshots RSn and RSn+1. The DIV may also identify information associated with the source, such as address, timestamp data, unique data associated with the snapshots (e.g., hashes, etc.), and so on. In some cases, a bitmap data structure can be included which indicates which blocks are different between the respective snapshots. Other data can be included in the DIV as desired, including in some cases some or all of the actual data blocks that are changed from one snapshot to the next.

Each reader (e.g., 126) that scans and reads the cloud store 124 can identify the two latest snapshot volumes and also access the intervening DIV. From this information, the reader can perform a reverse volume copy. For example, the reader system can access (either locally or retrieve) a base volume corresponding to the previous snapshot, and then request, as required, the necessary changed blocks to provide the most up-to-date system volume. In some cases, a tree structure can be used to track all changes, and as many DIV volumes can be accessed as required to recreate and update the local data by the local reader.

If the respective readers are endeavoring to maintain up-to-date replicas of the data volume, the first replication operation may require a full transfer of the first snapshot. From that point forward, however, only the DIV and updated data blocks (as well as any other information as required) need to be transferred for subsequent replication operations. Depending on operability, it may be possible for a second reader (reader storage subsystem 2) to request and obtain data (e.g., the DIV, etc.) from a first reader (reader storage subsystem 1) to further reduce the data requirements upon the cloud store so that chained replication may occur among the various readers. This is represented by an optional dotted line arrow in FIG. 3.

Figure 4:
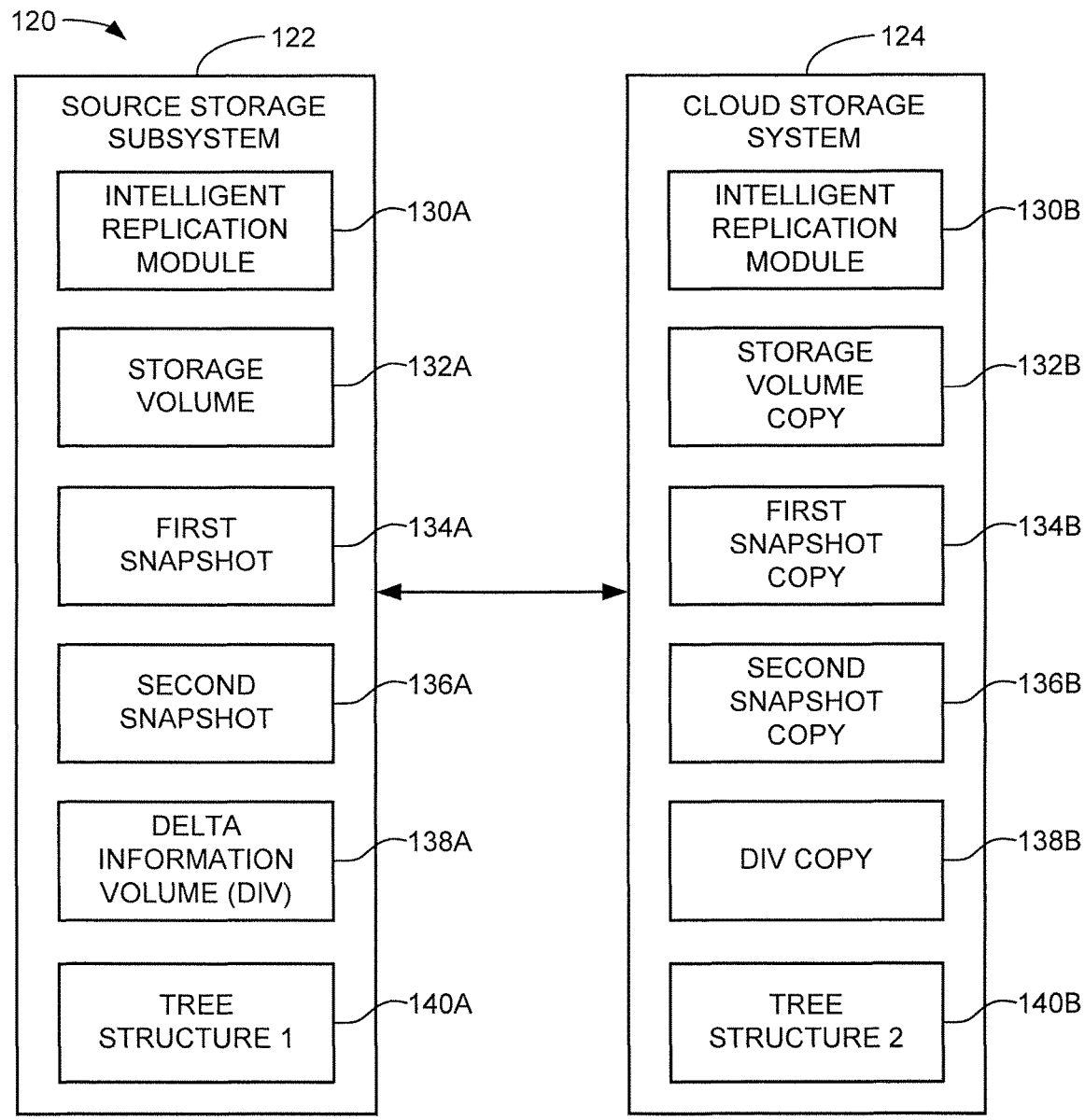
FIG. 4 is a functional representation of the source storage subsystem and the cloud storage system of FIG. 3 in some embodiments.

FIG. 4 is a functional block representation of the source storage subsystem 122 and the cloud storage system 124 from FIG. 3 in accordance with some embodiments. The source 122 includes various elements including an intelligent replication module 130A operable to carry out the various tasks discussed above. The module 130A can take a variety of forms, including one or more programmable processors that use program instructions in the form of firmware (FW) which are loaded to a local memory for execution. Other configurations can be used, including hardware based circuits, etc.

The source 122 further includes memory in which various data sets and structures are stored, including a storage volume 132A, a first snapshot 134A, a second snapshot 136A, a delta information volume (DIV) 138A, and an optional first tree structure 140A. Other configurations can be used, including configurations with fewer or other data sets and structures. For example, the source 122 may generate these various elements but not necessarily retain these over time during normal operation.

Generally, the storage volume 132A represents the most up-to-date localized version of a data set owned/controlled by a user of the source 122. The data set can take any number of forms, but generally represents data that is periodically uploaded/saved to the cloud via transfer to the cloud store 124.

The first snapshot 134A represents a first (prior version) of the storage volume that was taken at a first point in time. The second snapshot 136A is a second (current version) of the storage volume that was taken at a subsequent second point in time. The DIV 138A indicates the differences between the first and second snapshots. The optional tree structure 140A shows history metadata that tracks these other elements.

The cloud store 124 receives periodic updates from the source 122 for cloud storage of the data. The cloud store 124 is shown in FIG. 4 to include a second intelligent replication module 130B. This may take a similar form to the first module 130A, or may take some other form. Various data sets and structures that correspond to those in the source 122 include a storage volume copy 132B, a first snapshot copy 134B, a second snapshot copy 136B, a DIV copy 138B and a second tree structure 140B. As before, other formats may be used.

In one example, the source 122 operates, via user interface, a generation operation to generate an initial storage volume. At some point in time, this may be uploaded to the cloud store 124. Updates may be generated in the form of snapshots which are also uploaded. In some cases, the entire updated data set may be uploaded. In other cases, the DIV information along with the updated data blocks may be uploaded so that the cloud store assembles and stores the updated storage volumes.

It will thus be appreciated that the DIV information, which is stored as a separate volume in the cloud store, can be also used by the cloud store as well as by the readers 126. The tree structure 140B may be generated by the cloud store 124 in order to track the various hierarchical changes made to each successive generation of the data. Generally, it is contemplated that the various data sets and structures may be initially generated locally and provided by the source 122 to the cloud 124, but such is not necessarily required. In other embodiments, the user (or a different user) may be authorized to make further changes to the storage volume copy at the cloud storage level.

Figure 5:
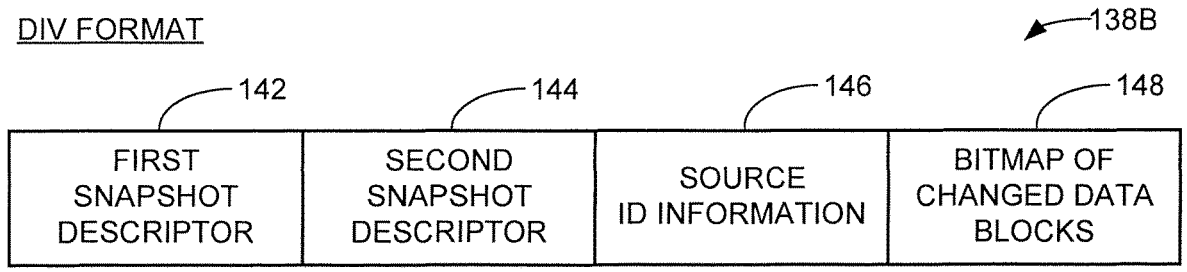
FIG. 5 shows an exemplary format for a delta information volume (DIV) data structure used by the system of FIG. 4 in some embodiments.

FIG. 5 is an exemplary format for the DIV copy 138B maintained by the cloud store 124. Other formats can be used. The DIV includes a first snapshot descriptor field 142, a second snapshot descriptor field 144, a source identification (ID) information field 146 and a bitmap of changed data blocks field 148. The field 142 generally provides descriptive information that describes the first snapshot (e.g., copy 134A). This can include location, datestamp, authentication, security (e.g., hash, etc.) and other types of appropriate information to enable location and accessing of the first snapshot copy 134A. The field 144 provides similar information for the second snapshot copy 136B.

The field 146 provides relevant information regarding the source. This may include information relating to the originating device, datestamp information, a list of authorizations/security features and requirements, etc. The field 148 may identify a bitmap as a data structure that identifies which data blocks or other portions of the storage volume have been modified in the second snapshot as compared to the first snapshot. In some cases, the actual changed portions (e.g., the updated data blocks) may be included in the DIV, although it is contemplated that providing a listing of the changed blocks will be sufficient for the reader to request those blocks from the second snapshot. The blocks can be identified in any number of suitable ways including the use of logical block addresses (LBAs), virtual block addresses (VBAs), key-values, object names, etc. The blocks may be identified using the same, or a different, nomenclature as used by the source 122.

Figure 6:
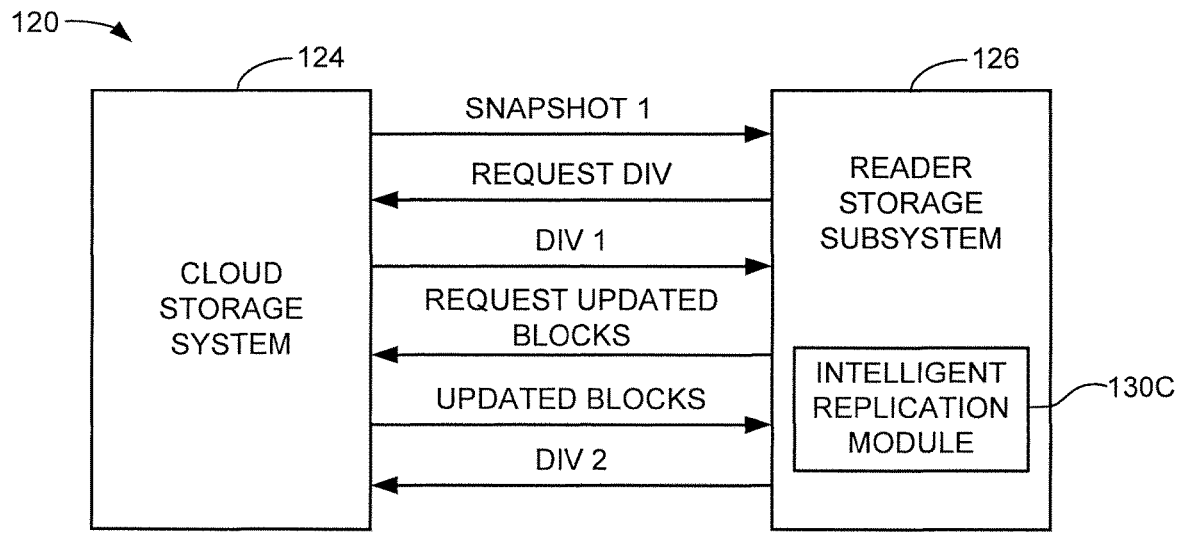
FIG. 6 shows a data exchange between the cloud storage system and a reader storage subsystem of FIG. 4 in some embodiments.

FIG. 6 shows aspects of the cloud store 124 and a selected reader 126 from FIG. 3 in accordance with further embodiments. Other configurations can be used. As with the source 122 and the cloud store 124, the reader 126 includes an intelligent replication module 130C, which may be configured as described above. The reader 126 in FIG. 6 generally operates to periodically generate a local replica of the latest storage volume from the source 122.

In some cases, the replicas will be generated as soon as new updates are provided by the source to the cloud store, so that the replicas at the reader subsystem level are nominally maintained in near real-time fashion (clearly, replicas cannot be generated instantaneously but they can be generated as soon as possible). In this approach, the cloud store may use the tree structure to identify those reader subsystems that are maintaining up-to-date replicas, and may provide a notification that updated data have been received from the source.

In other cases, the reader may only periodically require copies of up-to-date replica data to perform certain functions. In this case, the reader may initiate the request, and one (or more) intervening DIVs may be used in order to build the latest replica at the reader level. If multiple DIVs are used to build the latest replica set, a backward search process may be used starting with the latest DIV and working backwards, with the knowledge that once a latest version of a data block is located, the previous intervening changes to the data block can be skipped.

In one example, an initial copy of the storage volume (e.g., snapshot 1) is transferred to the reader 126 to provide a locally stored (baseline) copy. At such time that an updated copy is required, the reader 126 requests the latest DIV, which is returned and evaluated. A request for the updated blocks is issued, and these are returned and combined with the first snapshot. As desired, completion data such as in the form of a second DIV or other form of metadata may be generated and transferred to the cloud store. In this way, the cloud store may be able to track what replicas are present in the system along with datecode and other suitable information.

It is contemplated although not necessarily required that the reader 126 actually request a copy of the DIV be transferred from the cloud store 124. In other embodiments, the system may be configured to automatically provide a notification and have the cloud store 124 pull and broadcast the updated blocks to each active reader, which in turn can perform the necessary updates to generate locally an associated replica copy.

Figure 7:
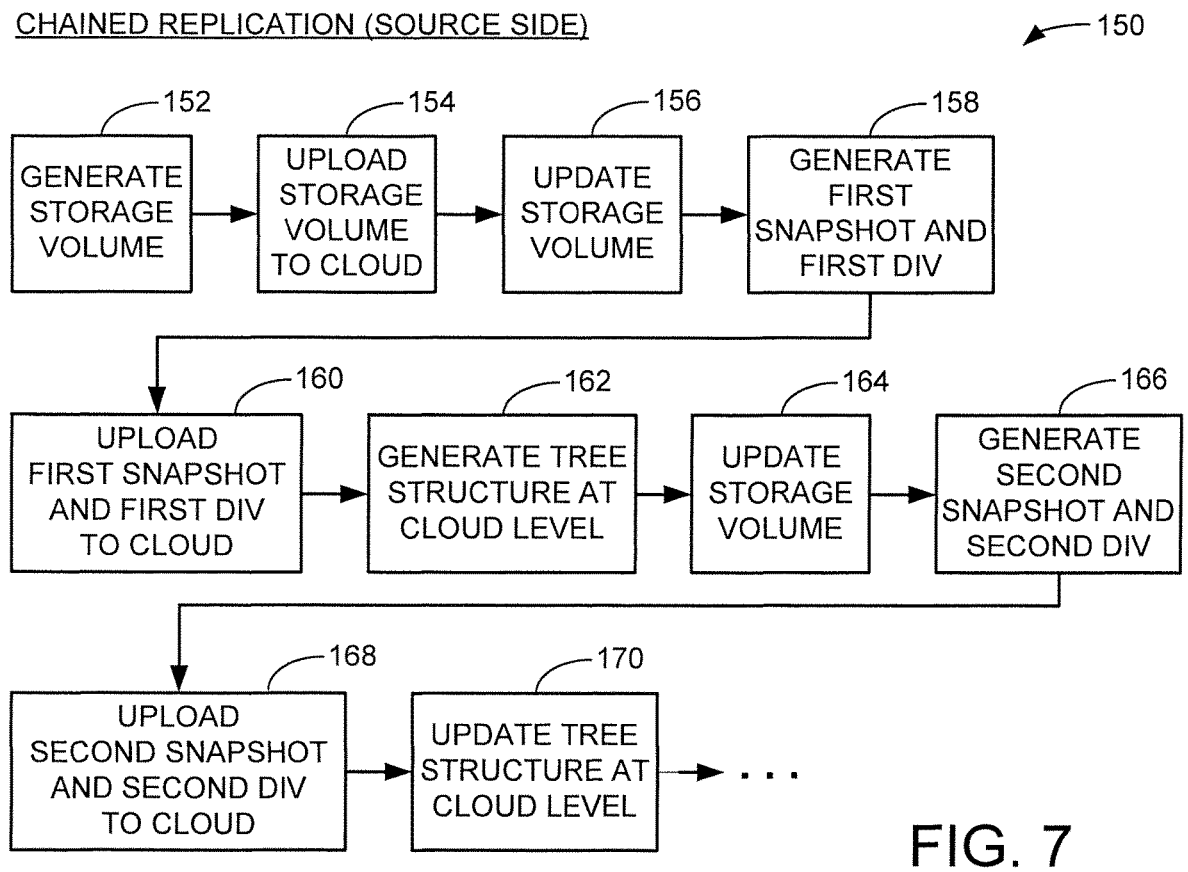
FIG. 7 is a sequence diagram illustrating operations of a chained replication sequence on the source side.

FIG. 7 shows a sequence diagram 150 to illustrate a source side uploading of data to the cloud store in accordance with the foregoing discussion. This is merely exemplary and other steps and operations may be used as desired. Initially, a storage volume is generated by a source device at block 152, and the storage volume is uploaded to the cloud at block 154.

At some point in the future, the user of the source updates the volume at block 156, generates a first snapshot and a first DIV at block 158, and uploads these data sets and structures to the cloud at block 160. As noted above, the entire snapshot can be uploaded, or only those blocks that were changed over the initial storage volume may be uploaded. An advantage of uploading the entire snapshot relates to reducing the processing required at the cloud store level, which is likely more configured to simply receive and process new data sets rather than performing significant data processing/updating of existing data sets. Nevertheless, either approach may be carried out as required.

The cloud store proceeds at block 162 to generate an initial tree structure at the cloud level to identify the relationships and storage locations of the respective storage volume, first snapshot and DIV. Depending on retention policies, the original storage volume (and all intervening snapshots after that) may be retained by the cloud store, even if such earlier versions are not made visible/accessible to the user of the source. The various data sets and structures may be subjected to replication for cloud store use, such as by providing copies to other cloud store servers, etc. in a known manner to ensure the stored data can be retrieved and accessed quickly and reliably.

The source continues to provide another update to the local storage volume at block 164, and the previously described actions are repeated at blocks 166, 168 and 170. This process continues so long as the source continues to generate and upload new, updated copies of the storage volume to the cloud. At any given time, the cloud store is maintained in a condition ready to service requests for the latest volume data from one or more readers, which will now be discussed in FIG. 8.

Figure 8:
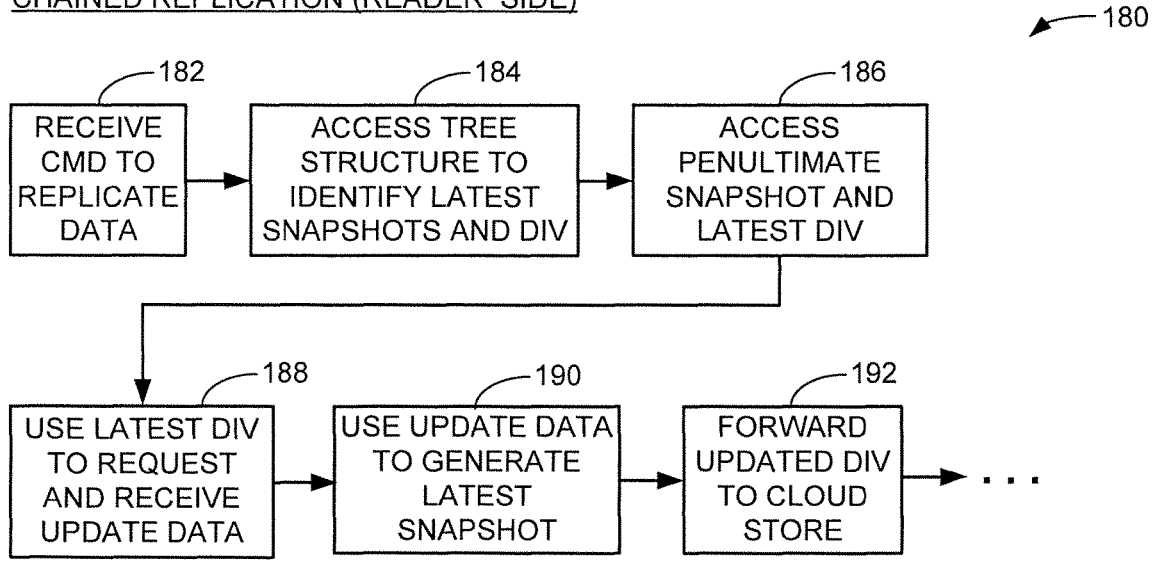
FIG. 8 is a sequence diagram illustrating operations of a chained replication sequence on the reader side.

FIG. 8 shows a sequence diagram 180 to illustrate a reader side replication operation to replicate the data uploaded in FIG. 7. At block 182, a command is received by the cloud store to replicate the data. As noted above, this is not necessarily required; in other embodiments, the replication may take place automatically as soon as the updated DIV is received by the cloud store from the source.

The cloud store operates at block 184 to access the tree structure to identify the latest DIV as well as the latest snapshots described thereby. As noted above, access to the latest snapshot (RSn+1) is likely going to be carried out, while access to the next latest snapshot (RSn) may or may not be, depending on the requirements of a particular application. The appropriate data sets and structures are transferred to the reader at block 186, which uses this information to generate a request for the appropriate updated data blocks from the latest snapshot (RSn+1) at block 188.

The reader proceeds to use the retrieved data to generate a copy of the latest snapshot (e.g., local replica) of the storage volume at block 190, after which updated DIV information associated with the reader operation is transferred to the cloud store at block 192. As before, the foregoing steps are repeated as required to maintain the local copy of the storage volume in an up-to-date state.

Figure 9:
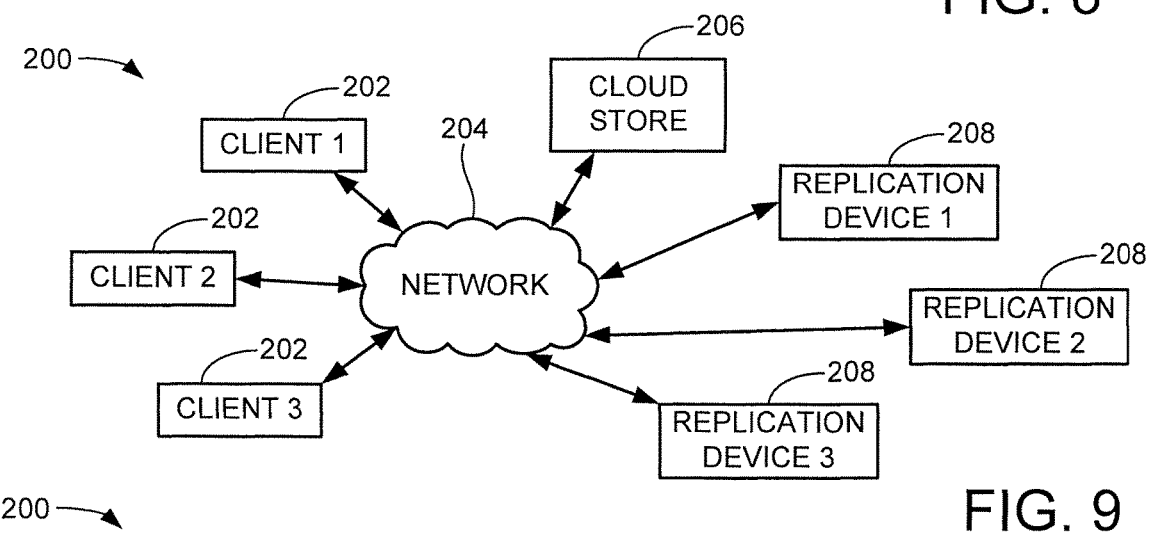
FIG. 9 is a network diagram of elements that can be adapted to implement various embodiments of the present disclosure.

FIG. 9 shows another network 200 similar to the network discussed above in FIG. 2. The network includes a number of client devices 202 which are connected to a cloud network 204 to various elements including a cloud store 206 and various replication devices 208.

As provided previously, the client devices 202 can take a number of forms including IoT devices, edge devices, local computers, etc. It is contemplated that the client devices correspond to the various source devices and are configured to generate/aggregate/process new data volumes as required. The cloud store 206 similarly provides main cloud storage processing and may represent servers in one or more geographically distributed data centers. The replication devices 208 are various types of readers that endeavor to replicate copies of the data from the clients.

Figure 10:
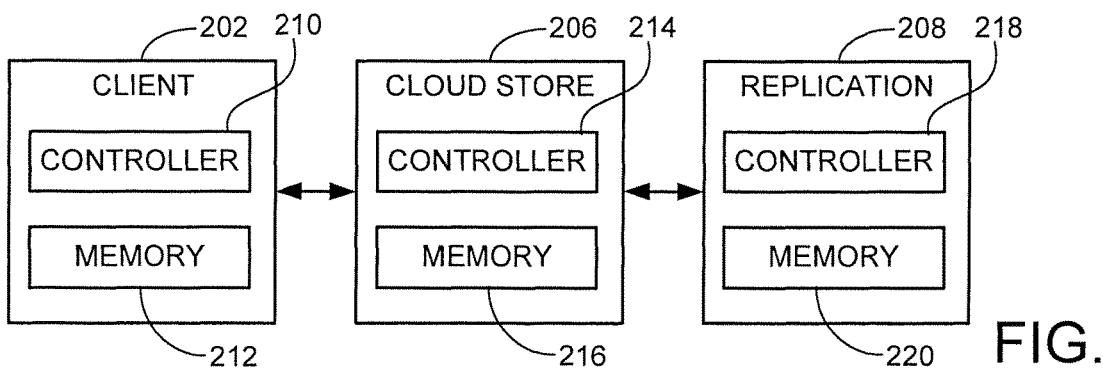
FIG. 10 is a functional representation of elements from FIG. 9 in some embodiments.

FIG. 10 shows a functional block representation of aspects of the network 200 from FIG. 9 in some embodiments. The client device 202 includes a controller 210 and memory 212. The cloud store 206 similarly has a controller 214 and memory 216, and the replication device has yet another controller 218 and memory 220.

It will be appreciated that the memory 212 in the client 202 may include both local memory (e.g., DRAM) as well as a main NVM store, such as flash memory or the like as described in FIG. 1. The controller 210, also sometimes referred to as a source storage controller circuit, similarly may comprise hardware and/or programmable processor circuits to enable the generation/processing of the storage volumes uploaded to the cloud store 206.

The cloud store 206 may be a server so that the controller 214, also referred to as a cloud storage controller circuit, is one or more banks of various forms of communication and storage processors with associated programming. The memory may include racks of storage devices (e.g., SSDs, HDDs, etc.) to provide a combined cloud storage space (e.g., a large main NVM store), as well as local volatile or non-volatile cache to cache the data transferred between the storage devices and the other elements in the network.

The replication device 208 is contemplated as also including one or more programmable processors as the controller 218, also sometimes referred to as a reader storage controller circuit. The memory 220 may be arranged in the form of both cache and NVM to store and utilize the replicated data sets.

Figure 11:
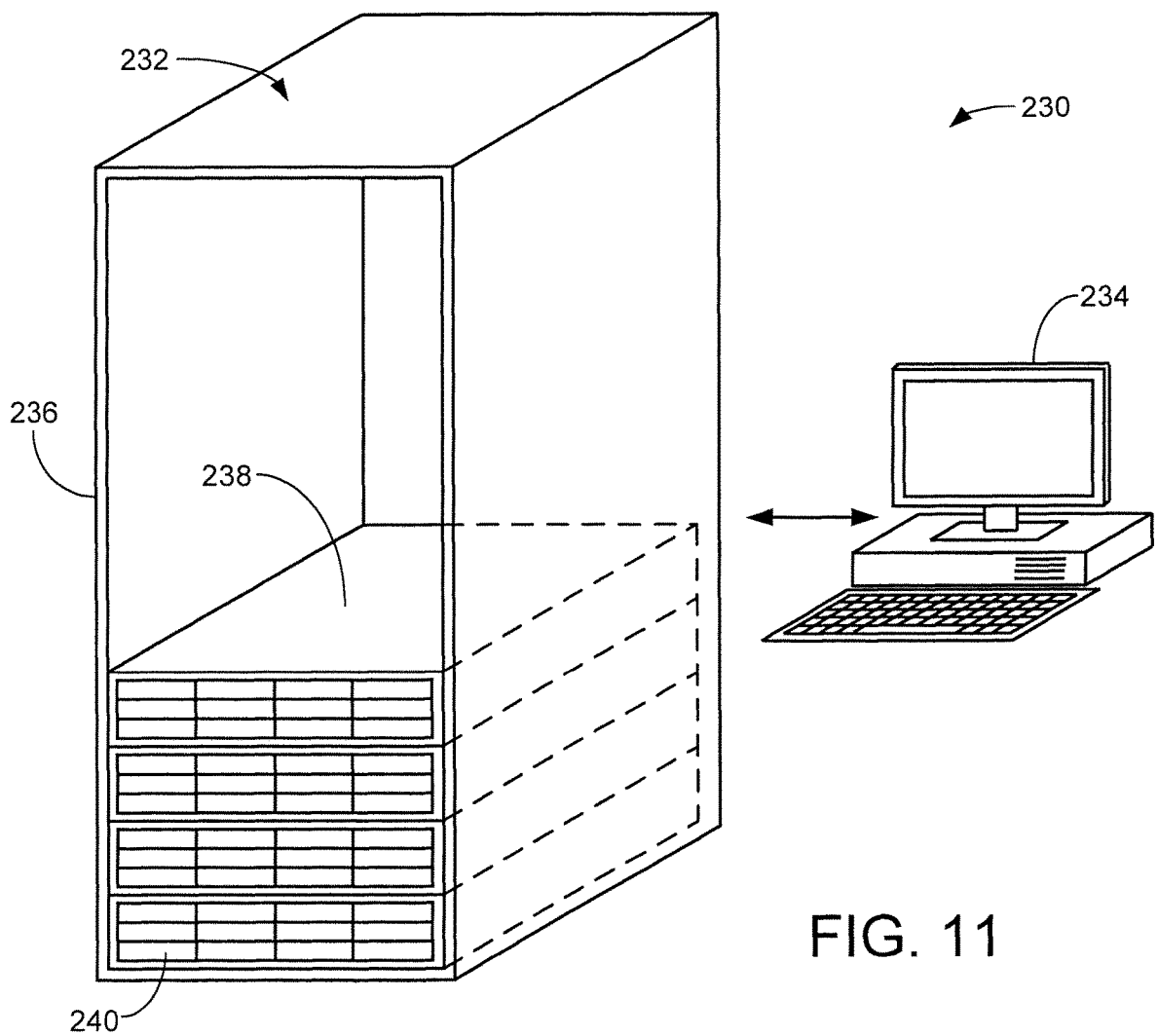
FIG. 11 shows a storage node of FIG. 10 in accordance with some embodiments.
Figure 12:
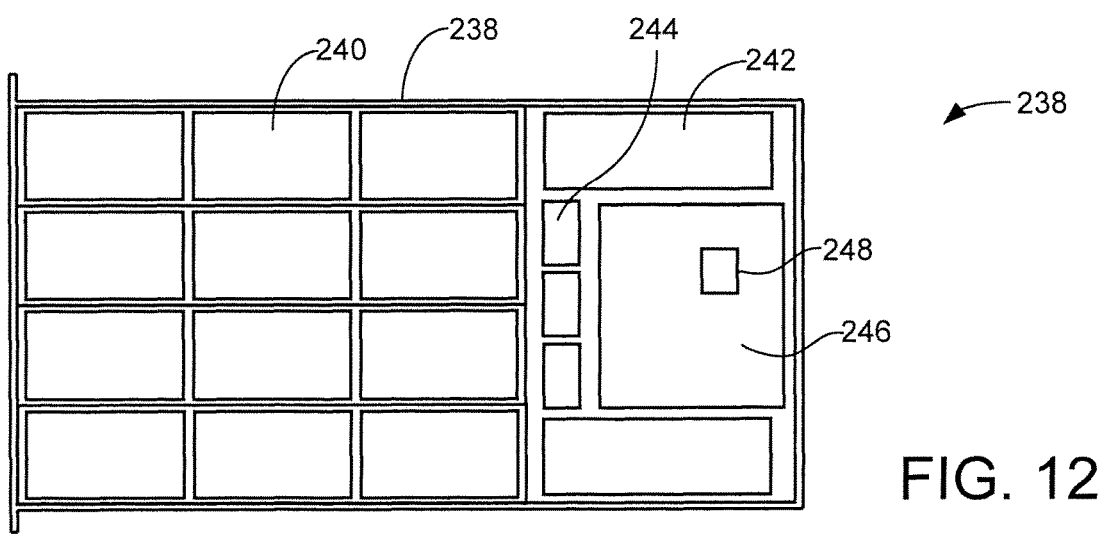
FIG. 12 shows a storage enclosure of the node of FIG. 11 in some embodiments.

FIGS. 11 and 12 show aspects of a storage node 230 that can form a portion of the cloud store 206 of FIG. 10 in some embodiments. Other architectures can be used.

The storage node 230 in FIG. 11 includes a storage assembly 232 and a storage controller (computer/server) 234. The storage assembly 232 may include one or more server cabinets (racks) 236 with a plurality of modular storage enclosures 238. In some cases, multiple zones may be defined in a single rack, multiple racks may constitute the same zone, etc. Moreover, the controller 234 can be incorporated into the rack or elsewhere as required.

The storage rack is a 42 U server cabinet with 42 units (U) of storage, with each unit extending about 1.75 inches (in) of height. The width and length dimensions of the cabinet can vary but common values may be on the order of about 24 in.×36 in. Each storage enclosure 238 can have a height that is a multiple of the storage units, such as 2 U (3.5 in.), 3 U (5.25 in.), etc.

FIG. 12 shows a selected enclosure 238 to incorporate 36 (3×4×3) data storage devices 240. Other numbers of data storage devices can be incorporated into each enclosure. The data storage devices 240 can take a variety of forms, such as hard disc drives (HDDs), solid-state drives (SSDs), hybrid drives (Solid State Hybrid Drives, SDHDs), etc. The storage devices 240 provide a portion of the main NVM store of the memory 216 (FIG. 10). Additional elements in the storage enclosure can include power supplies 242, fans 244 and a controller board 246 with processor (CPU) 248.

The various storage volumes, snapshots, DIV structures and tree structures can be managed by the storage node, with copies maintained in the storage devices 240. In some cases, appropriate levels of controller functionality can be selected to provide the DIV and data block management as described above. The various storage volumes, snapshots and DIV volumes may be replicated and stored using parallel channel access paths to allow efficient, concurrent transfer operations.

It will be appreciated that using the next to last snapshot (RSn) plus the DIV information to form the chained replicas can be advantageous for a number of reasons. Not only does this reduce the need to send a complete copy of each snapshot to the various reader devices, but it is likely that the previous snapshot will have already been replicated and stored to the local storage devices in the cloud store, while the new snapshot (RSn+1) may still be in cache pending transfer/replication.

In some cases the data blocks requested/needed by the reader device(s) may be present in the local cloud store cache, and can be serviced using a cache hit mechanism so that it is not necessarily required to access the storage devices. Stated another way, the requested data blocks can both transferred to the readers while the data blocks are also being written to the storage devices at the cloud level. This can further reduce the overhead processing required to obtain the replicated copies, and can in some cases result in faster replication of the data. Write cache retention may be enacted by the cloud store controller 214 to temporarily retain the affected data blocks so that the blocks can be forwarded prior to being jettisoned from the cache. The visibility afforded by the DIV enables cache manager aspects of the controller 214 to quickly and easily identify these blocks.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
uploading snapshots of a data set from a source storage subsystem to a cloud storage memory, each of the snapshots comprising a plurality of data blocks;
generating and transferring a difference information volume (DIV) from the source storage subsystem to the cloud storage memory, the DIV comprising a data structure that identifies a set of updated data blocks that have been changed by the source storage subsystem between two successive snapshots of the data set;
using the DIV to identify and transfer the set of updated data blocks to a reader subsystem; and
assembling, by the reader subsystem, a copy of the latter of the two successive snapshots by combining the set of updated data blocks with the former of the two successive snapshots.

2. The method of claim 1, further comprising requesting, by the reader subsystem, a copy of the DIV and transferring, from the cloud storage memory, the requested copy of the DIV to the reader subsystem.

3. The method of claim 2, further comprising identifying and requesting, by the reader subsystem, the set of updated data blocks responsive to a review of the requested copy of the DIV transferred to the reader subsystem.

4. The method of claim 1, wherein the DIV comprises a first snapshot descriptor that identifies the former snapshot, a second snapshot descriptor that identifies the latter snapshot, a source identification (ID) field that identifies information associated with the source storage subsystem, and a bitmap that identifies the set of updated data blocks in the latter snapshot.

5. The method of claim 1, further comprising generating and storing, in the cloud storage memory, a tree structure that identifies each of a plurality of the snapshots of the data set and each of a corresponding plurality of intervening DIVs stored in the cloud storage memory.

6. The method of claim 5, wherein a storage controller circuit associated with the cloud storage memory uses the tree structure to identify a first storage location of the DIV and forward the DIV from the first storage location to the reader subsystem.

7. The method of claim 6, wherein the storage controller circuit further uses the tree structure to identify a second storage location of the set of updated data blocks and forward the set of updated data blocks from the second storage location to the reader subsystem.

8. The method of claim 1, wherein the cloud storage memory comprises a non-volatile memory (NVM) main store and a cache memory, wherein the former snapshot and the DIV are stored to the NVM main store, wherein the latter snapshot is temporarily stored in the cache memory pending transfer to the NVM main store, and wherein a storage controller circuit associated with the cloud storage memory uses the DIV to identify and transfer the set of updated data blocks from the cache memory to the reader subsystem.

9. The method of claim 1, wherein the source storage subsystem comprises a client device coupled to a cloud storage system via a cloud network, the cloud storage system configured to manage the cloud storage memory.

10. The method of claim 1, wherein the source storage subsystem comprises an edge computing device coupled between a client device and a cloud storage system, the cloud storage system configured to manage the cloud storage memory.

11. The method of claim 1, further comprising generating and transferring, by the reader subsystem to the cloud storage memory, metadata associated with the copy of the latter of the two successive snapshots assembled by the reader subsystem.

12. The method of claim 1, wherein the reader subsystem is a first reader subsystem, and the method further comprises using a second reader subsystem to request and receive a second copy of the DIV from the first reader subsystem and to use the second copy of the DIV to generate a second copy of the latter of the two snapshots of the data set.

13. A system comprising:
a cloud storage system comprising a cloud storage controller circuit and a cloud storage memory;

a source storage subsystem comprising a source storage controller circuit and a source storage memory, the source storage controller circuit configured to generate and upload a sequence of snapshots of a data set and intervening difference information volume (DIV) data structures to the cloud storage memory, each DIV data structure identifying a set of updated data blocks that have been changed by the source storage controller circuit between each successive pair of the sequence of snapshots; and a reader subsystem comprising a reader storage controller circuit and a reader storage memory, the reader storage controller circuit configured to request a copy of a latest DIV data structure from the cloud storage system, to use the copy of the latest DIV data structure to request a copy of a latest set of updated data blocks between a latest snapshot and a most immediately previous snapshot stored by the cloud storage system, and to generate a copy of the latest snapshot using the latest set of updated data blocks and a copy of the most immediately previous snapshot stored by the reader subsystem.

14. The system of claim 13, wherein the reader subsystem is further configured to transfer metadata to the cloud storage system responsive to successful generation of the copy of the latest snapshot using the copy of the latest set of updated data blocks from the cloud storage system.

15. The system of claim 13, wherein the reader subsystem is further configured to transfer the copy of the latest DIV data structure to a second reader subsystem.

16. The system of claim 13, wherein the copy of the latest DIV data structure comprises a first snapshot descriptor that identifies the most immediately previous snapshot, a second snapshot descriptor that identifies the latest snapshot, a source identification (ID) field that identifies information associated with the source storage subsystem, and a bitmap that identifies the set of updated data blocks in the latest snapshot.

17. The system of claim 13, wherein the cloud storage controller circuit is further configured to generate and store, in the cloud storage memory, a tree structure that identifies each of the sequence of snapshots and intervening DIV data structures in the cloud storage memory, and to use the tree structure to transfer the copy of the latest DIV data structure and the copy of the latest set of updated data blocks to the reader subsystem.

18. An apparatus comprising:
a cloud storage memory system; and
a data storage device comprising a non-volatile memory (NVM) and a controller circuit configured to generate and upload a sequence of snapshots of a data set and intervening difference information volume (DIV) data structures to the cloud storage memory system across a network, each DIV data structure identifying a set of updated data blocks that have been changed by the controller circuit between each successive pair of the sequence of snapshots;
the cloud storage memory system comprising a reader subsystem comprising a reader storage controller circuit and a reader storage memory, the reader storage controller circuit configured to request a copy of a latest DIV data structure from the reader storage memory, to use the copy of the latest DIV data structure to request a copy of a latest set of updated data blocks between a latest snapshot and a most immediately previous snapshot, and to generate a copy of the latest snapshot using the latest set of updated data blocks and a copy of the most immediately previous snapshot.

19. The apparatus of claim 18, wherein the reader storage controller circuit requests the latest set of updated data blocks between a latest snapshot and a most immediately previous snapshot from the reader storage memory.

20. The apparatus of claim 18, wherein the reader storage controller circuit generates the copy of the latest snapshot using the latest set of updated data blocks and the copy of the most immediately previous snapshot by retrieving the most immediately previous snapshot from the reader storage memory.

* * * * *